Aug. 7, 1928.  1,679,936
H. C. FORD
RANGE CONVERTER
Filed Aug. 16, 1918   4 Sheets-Sheet 1

INVENTOR
Hannibal C. Ford
BY
Henry Mockley
ATTORNEY

Aug. 7, 1928.
H. C. FORD
1,679,936
RANGE CONVERTER
Filed Aug. 16, 1918
4 Sheets-Sheet 2
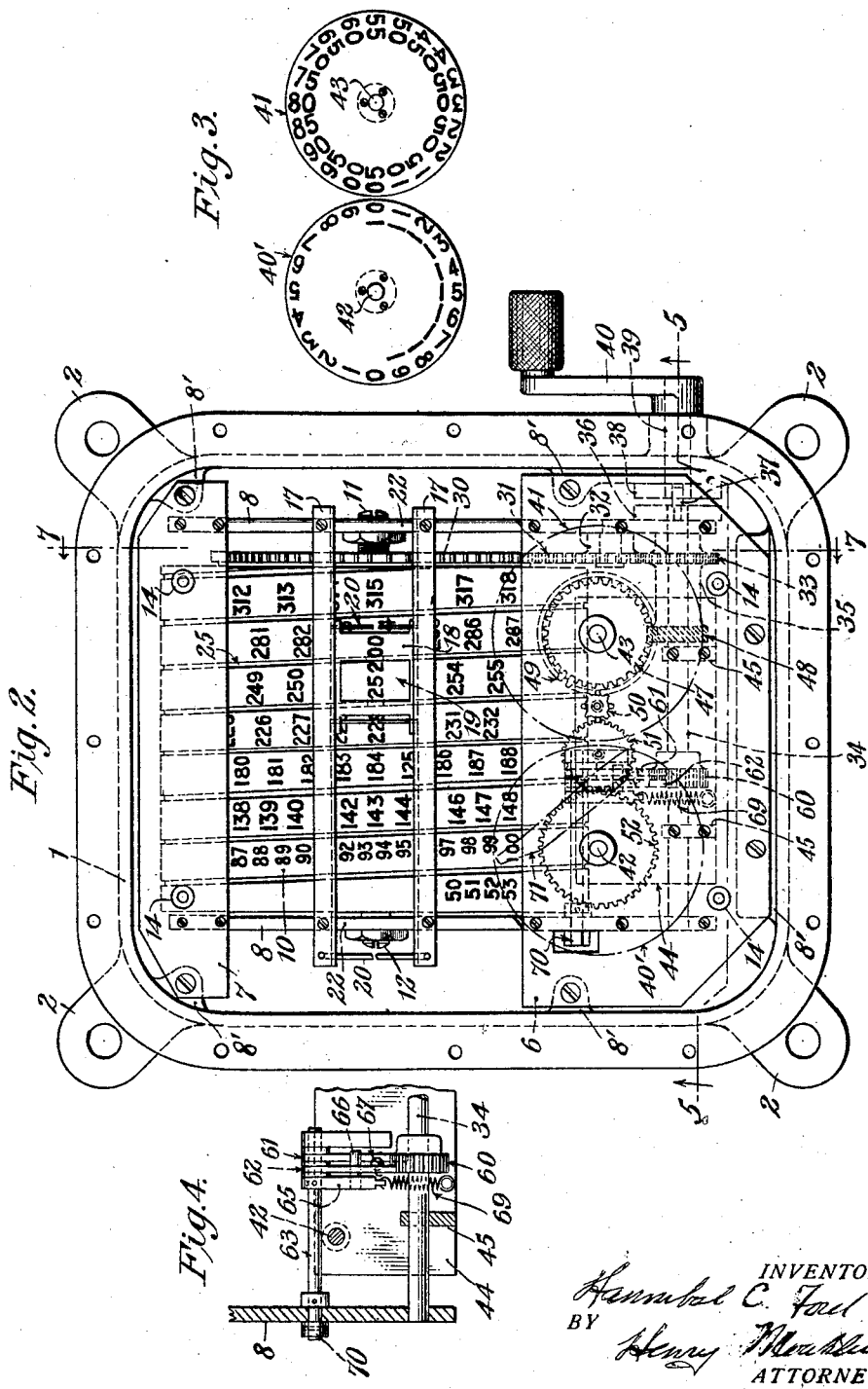
INVENTOR
Hannibal C. Ford
BY Henry Moehler
ATTORNEY

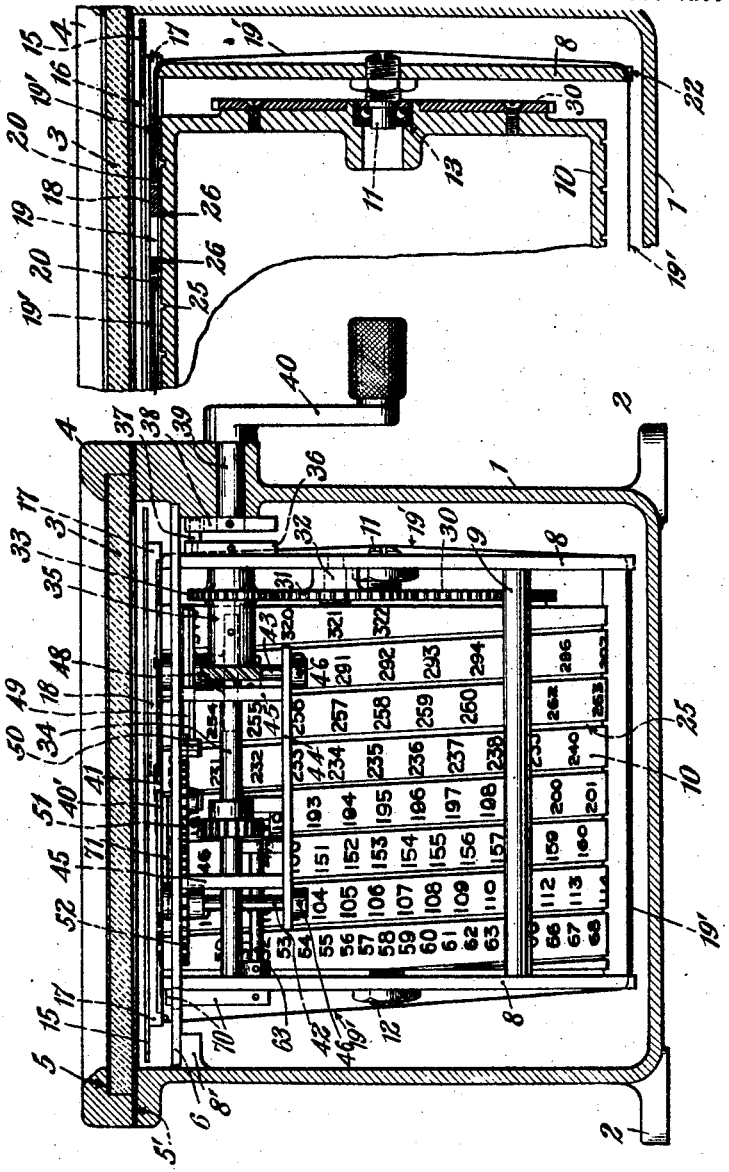

Aug. 7, 1928.
H. C. FORD
1,679,936
RANGE CONVERTER
Filed Aug. 16, 1918
4 Sheets-Sheet 4
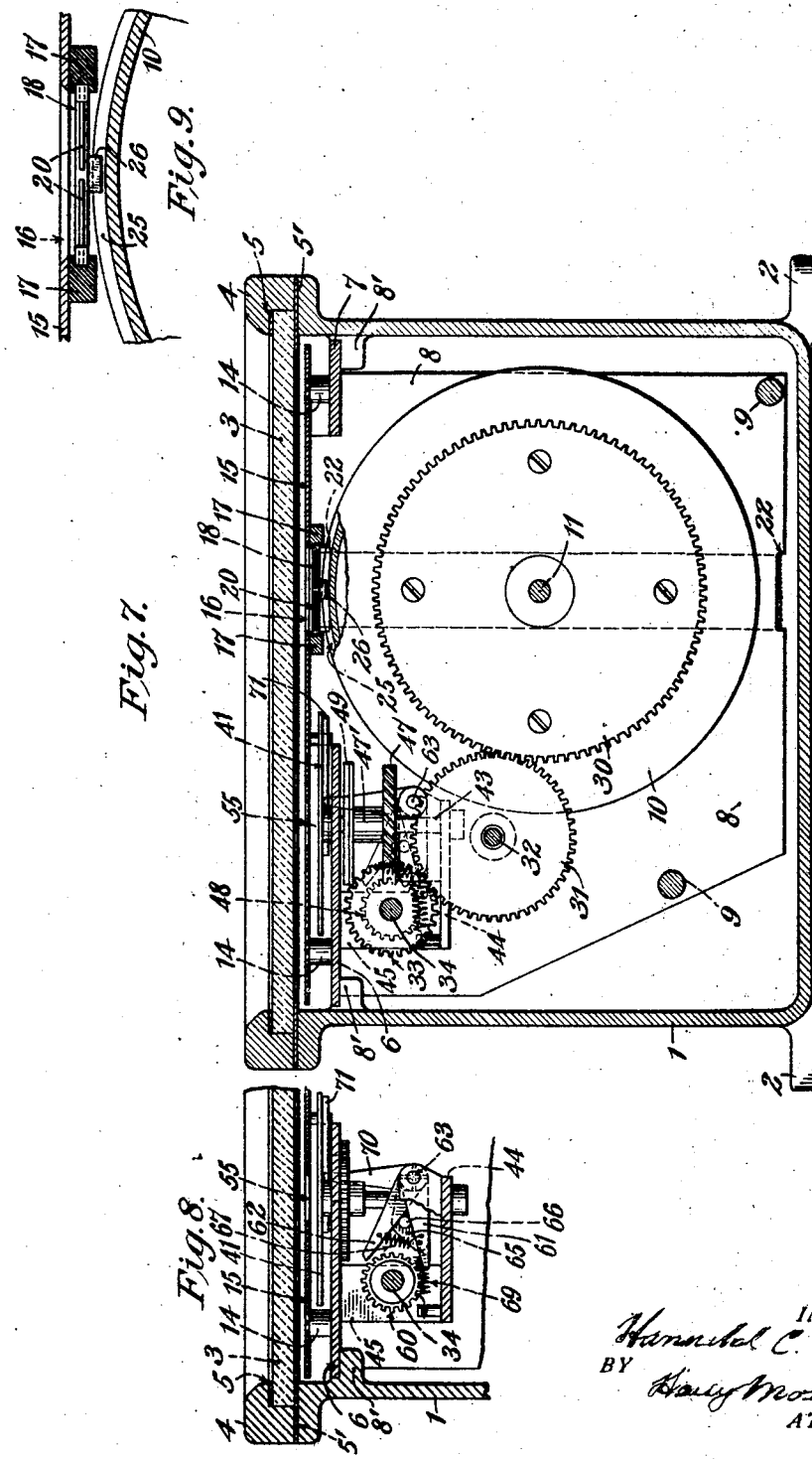
INVENTOR
Hannibal C. Ford
BY
Harry Moseley
ATTORNEY Patented Aug. 7, 1928.

1,679,936

UNITED STATES PATENT OFFICE.

HANNIBAL C. FORD, OF JAMAICA, NEW YORK, ASSIGNOR TO FORD INSTRUMENT COMPANY, INC., OF NEW YORK, N. Y., A CORPORATION OF NEW YORK.

RANGE CONVERTER.

Application filed August 16, 1918. Serial No. 250,227.

This invention relates to range converters or more particularly to an instrument for converting readings of range into equivalent readings of minutes of elevation for laying a gun or vice versa.

One object of the invention is to provide an instrument of this character having relatively large graduations for indicating ranges and equivalent gun elevations whereby the values of the readings of these graduations may be easily read by the operator and whereby the accuracy of the readings is greatly increased.

A further object of the invention is to provide an instrument which is adapted to be utilized with a step-by-step electrical transmission system for transmitting the readings of gun elevation from a remote point to a gun.
Other objects of the invention are to provide an instrument which is of a simple construction and which does not require the accuracy and nicety of adjustment ordinarily required for an instrument of this character.
With these and other objects in view, the invention consists of the constructions and combinations which will be hereinafter set forth and will be particularly pointed out in the appended claims.
In the drawings:—

Fig. 2 is a view similar to Fig. 1 with the bezel and top plate removed to more clearly show the interior mechanism;

Fig. 3 is a detail showing the arrangement of dials for indicating the gun elevation in minutes of arc;

Fig. 4 is a detail of the stop mechanism;
Fig. 5 is a section on the line 5—5 of Fig. 2;

Fig. 6 is a sectional detail showing the shutter and ribbon and also the bearing for the range drum;
Fig. 7 is a section on the line 7—7 of Fig. 2;

Fig. 8 is a detail of the stop mechanism and

Fig. 9 is a detail of the shutter which rides across the face of the range drum.

Figure 1:
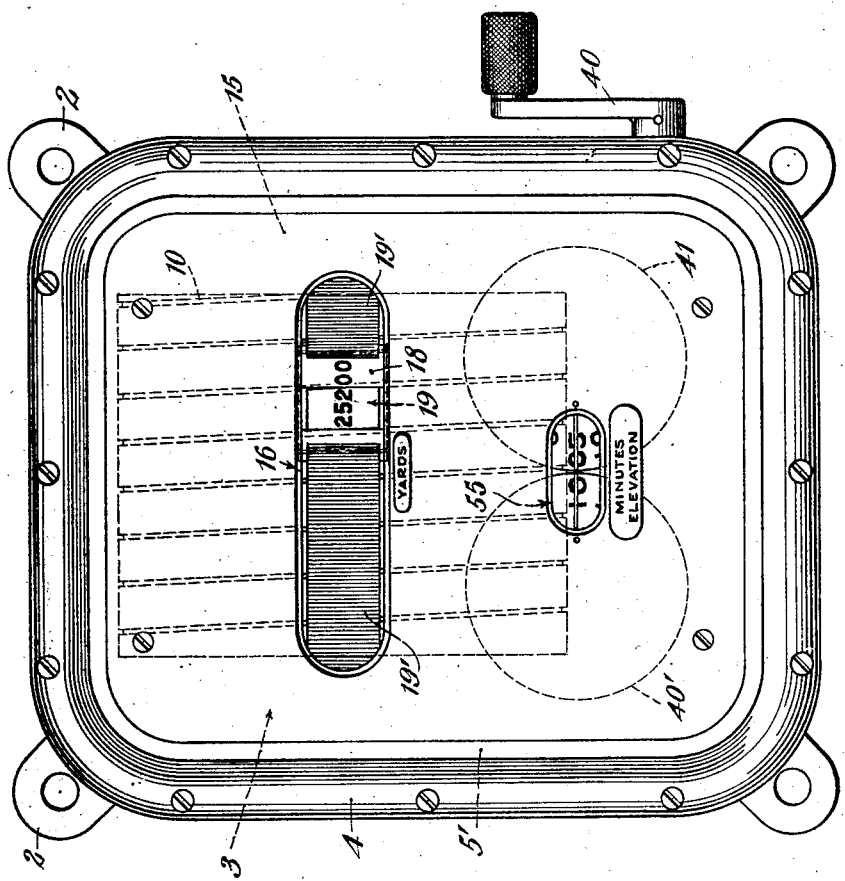
Fig. 1 is a plan of one embodiment of the invention.

The instrument disclosed, which is one embodiment of the invention, comprises a casing 1 which is provided with lugs 2 for securing it in place and a glass cover plate 3 which is held in position by a bezel 4, the glass cover plate being separated from the bezel and the top of the casing by rubber gaskets 5 and 5'. The range converter is removably mounted within this closed casing by a frame which consists of two supporting plates 6 and 7 which are secured to side plates 8, the side plates being held in spaced relation by rods 9, the parts forming a rigid frame which is supported upon lugs 8' extending from the inner wall of the casing 1.

Mounted between the side plates 8 is a range drum 10 which, as is disclosed in Fig. 6, is a hollow cylindrical body, closed at both ends. The range drum is supported upon stud shafts 11 and 12, the drum being free to rotate upon these shafts by means of ball bearings 13 (see Fig. 6).

Mounted above the range drum and supported by means of posts 14 which are secured to the supporting plates 6 and 7, is a top plate 15. The top plate 15 is of slightly less size than the interior of the casing and conceals the mechanism of the converter. This top plate is provided with an elongated slot or opening 16. Mounted in slides or guide ways 17 which are secured to the under face of the top plate adjacent to the walls of the opening 16, is a shutter 18 which is provided with an opening 19 through which a portion of the range drum may be seen. A ribbon 19' is secured at its ends to pins 20 carried by the ends of the shutter, and extends around the side plates 8, forming with the shutter, an endless band or belt which conceals the portion of the drum which would otherwise be visible through the opening 16. The edges of the side plates 8 are grooved as at 22 to provide seats for the ribbon and thus prevent its inadvertent displacement.

The range drum 10 carries a helical groove 25 and the shutter 18 has down turned lugs or ears 26 which ride in two adjacent convolutions of groove 25 whereby, when the range drum is rotated, the shutter will move longitudinally across the face of the drum and thus bring successive portions of the range drum behind the opening 19 in the shutter. The range drum between the turns of the helical groove 25, is provided with a continuous series of non-uniform divisions or graduations, the divisions being proportional to the gun elevation in minutes of arc which correspond to the ranges indicated by the numerals which define the graduations. In the construction shown, the range converter is designed for ranges between 5,000 and 32,200 yards, and the range drum is provided with numerals starting with 50 and continuing in succession up to 322, the ciphers 00 on the shutter 18 being arranged to co-operate with the numbers upon the range drum to give the desired range reading, as for example, in Fig. 1 the figures 252 on the top range drum co-operate with the two ciphers to give a reading of 25,200 yards. These numerals as before stated, are spaced in proportion to the minutes of elevation of a gun corresponding thereto, for as is well known in fire control, the angle to which a gun must be elevated in order to shoot its projectile a desired range, is not directly proportional to the range but increases as the range becomes greater. The difference in the successive angles of elevation for the successive changes in range of 100 yards may be obtained from range tables which are in common use and the spacing or graduations of the range drum are laid out accordingly. It is understood that these graduations will vary with the particular type of gun with which the converter is to be used, similar to the range drums now utilized in fire control for laying a gun or setting the sights of a gun.

The range drum has secured to it at one end a gear 30 by which it is driven through an idler gear 31 carried upon a stud shaft 32 secured to one of the side plates 8 of the frame and a gear 33 which is mounted upon a shaft 34 on a sleeve 35. The shaft 34 at one end carries a disk 36 provided with a pin 37 which pin fits in a slot in a disk 38 carried by a shaft 39. The shaft 39 is rotatably mounted in the side wall of the casing 1 and carries a crank 40 by which it is manually driven. The pin and slot connection between the disks 36 and 38 permit the mechanism to be removed from the casing without disturbing the crank or handle 40. As will be clear from the above description, when the gear 30 is driven by the crank 40, the range drum is rotated and the range readings will appear successively behind the opening 19 in the shutter 18 which moves longitudinally across the face of the range drum so that the opening in the shutter will always be in alinement with the proper range reading.

Referring now to the indicator for designating the range in minutes of elevation, this indicator comprises two dials 40′ and 41 which are mounted upon shafts 42 and 43 respectively. The shafts 42 and 43 are supported between the supporting plate 6 and an auxiliary supporting plate 44 by means of plates 45. The ends of the shafts 42 and 43 project through the plate 44 and are provided with collars 46 to prevent their displacement. The shaft 43 which carries the dial 41 is driven by a spiral gear 47 having a hub 47′ which is secured to the shaft 43 by a pin or any other suitable fastening means. The spiral gear 47 meshes with a spiral gear 48 mounted upon the sleeve 35 which carries the gear 33, through which the range drum is driven. By this construction the dial 41 is displaced angularly, directly proportional to the angular displacement of the range drum. The shaft 42 which carries the dial 40′ (see Fig. 2), is connected by a transfer mechanism to the shaft 43, which consists of Geneva gears 49 and 50 and gears 51 and 52. This type of transfer mechanism is of a well known type and is designed to impart a one-twentieth of a revolution to the dial 40′ for each complete revolution of the dial 41. As disclosed in Fig. 3 the dial 41 is divided into 20 equal divisions which are designated 00 to 95 while the dial 40′ is divided into an equal number of divisions which are designated 0 to 19. These dials are arranged adjacent to each other and appear behind an opening 55 in the top plate 15, the numerals upon the two dials co-operating to give the reading in minutes of gun elevation corresponding to the range reading appearing behind the opening in the shutter 16, as for example, in Fig. 1 a reading of 1,005 minutes of elevation is shown which corresponds to the gun elevation for a range of 25,200 yards for the particular gun for which the range converter has been designed.

It is to be noted that by utilizing the two dials 40′ and 41 for indicating the minutes of elevation, relatively large angular displacements of the dials may be utilized for indicating relatively small angular displacements of the gun, as for example, a complete rotation of the dial 41 will only indicate a change in gun elevation of 100 minutes, or less than two degrees. It is for this reason that the graduations upon the range drum may be spaced relatively large distances apart and a plurality of turns of a helix used since the range drum will also be rotated through a complete revolution for relatively small changes in range.

In order to prevent the shutter from jamming when it is at either extreme end of its travel, a stop mechanism is provided for preventing further rotation of the range drum when the drum is rotated beyond the readings at either end thereof. This stop mechanism consists of a gear 60 which is fastened to the shaft 34 and fingers 61 and 62, either of which is adapted to engage the gear 60 to prevent further rotation thereof. The fingers 61 and 62 are mounted upon a rocker shaft 63 and are normally held out of engagement with the gear 60 by a centralizing device comprising a plate 65 which carries a pin 66 against which both fingers are held by means of a spring 67. The plate 65 is also held in neutral position by a spring 69. The rocker shaft 63 also carries a rocker arm or lever 70 which projects upwardly through an opening in the plate 6 and is adapted to engage a cam 71 upon the under face of the dial 40'. When the dial 40' therefore, passes beyond the limits of the range drum in either direction, (which occurs after a partial revolution of the dial 40') one of the ends of this cam engages the rocker arm 70 to cause either the fingers 61 or 62 to engage the gear 60 and prevent further rotation of the drum. This stop mechanism is clearly disclosed in detail in Figs. 4 and 8.

The operation of the instrument is obvious from the above description but will be briefly referred to. Assuming that the minutes of elevation of a gun for any particular range is required, the crank 40 is turned until the range appears opposite the opening in the shutter and the corresponding gun elevation in minutes of arc is read from the dials 40' and 41. The range corresponding to any gun elevation may also be obtained in the same manner.

While the invention has been shown and described in the form of a range converter, it will be understood that it may be used for indicating the corresponding values of any two quantities, particularly in cases where the values of one quantity vary non-uniformly with respect to those of another quantity.

I claim:

1. A range converter comprising a drum having a helically arranged range scale having its graduations spaced according to corresponding gun elevations, a shutter having a view opening therein, means for moving said shutter across the face of said range drum, means for concealing the drum other than the portion visible through said view-opening and mechanism for indicating gun elevation geared to said range drum.

2. A range converter comprising a range-drum having a helically arranged range scale thereon, a casing concealing said range scale having a slot therein, a shutter having a view-opening therein slidable in said slot through which a portion of said range scale is visible, an endless belt secured to said shutter for concealing the remainder of said slot, and means for moving said shutter in said slot and extending longitudinally and around the ends of said range-drum as the drum is turned.

3. In an instrument for indicating corresponding values of two quantities one of which varies non-uniformly with respect to the other, a rotatable member having a series of equally spaced graduations thereon representing values of one of the quantities, a cylindrical rotatable member provided with a helically disposed series of graduations representing values of the other quantity, said graduations being unequally spaced in accordance with the non-uniform variation of the first quantity with respect to said other quantity, means associated with one of the members for indicating values of the quantities shown thereon corresponding to values of the quantities shown by the other member and means whereby the members and indicating means may be operated in unison.

4. A range converter comprising a rotatable member having a series of uniformly spaced graduations thereon representing equal increments of gun elevation in angular measure, a rotatable cylindrical member having a helically disposed series of graduations thereon representing equal increments of range in linear measure, the last named graduations being unequally spaced in accordance with the non-uniform changes in gun elevation corresponding to uniform changes in range, means associated with the cylindrical member for indicating values of the quantities shown thereon corresponding to values of the quantities shown by the other member and means whereby the members and indicating means may be operated in unison.

5. In an instrument for indicating corresponding values of two quantities, a rotatable member provided with a series of graduations representing values of one of the quantities, a second rotatable member provided with a continuous series of graduations representing values of the other quantity, means whereby the members may be operated in unison including a driving connection in which there is a shaft, and stop mechanism for limiting the movement of the second rotatable member comprising a toothed member on said shaft, engagement means therefor normally held out of contact therewith, and means controlled by movement of the first rotatable member operable in a given position thereof to force said engagement means into contact with said toothed member.

6. In an instrument for indicating corresponding values of two quantities, a casing, a fixed frame therein, a rotatable member provided with a series of graduations representing values of one of the quantities, a drum rotatably mounted in said frame and provided with a continuous series of graduations representing the values of the other quantity, means whereby said member and drum may be operated in unison, a guideway extending across said frame and the face of the drum in fixed relation to the frame, an apertured shutter slidable longitudinally of said guideway and drum and operable by the latter, and a flexible belt attached to opposite sides of said shutter and mounted to move around said fixed frame.

HANNIBAL C. FORD.

CERTIFICATE OF CORRECTION.

Patent No. 1,679,936.  Granted August 7, 1928, to

HANNIBAL C. FORD.

It is hereby certified that error appears in the printed specification of the above numbered patent requiring correction as follows: Page 3, lines 55 and 56, claim 2, strike out the words "and extending longitudinally and around the ends of said range-drum" and insert the same to follow after the word "slot" in line 54; and that said Letters Patent should be read with this correction therein that the same may conform to the record of the case in the Patent Office.

Signed and sealed this 11th day of September, A. D. 1928.

(Seal)

M. J. Moore,
Acting Commissioner of Patents.